United States Patent

[11] 3,594,045

| [72] | Inventors | Karl A. Pannier, Jr.;<br>Gordon S. Reynolds, both of Salt Lake City, Utah |
|---|---|---|
| [21] | Appl. No. | 18,837 |
| [22] | Filed | Mar. 12, 1970 |
| [45] | Patented | July 20, 1971 |
| [73] | Assignee | Le Voy's, Inc.<br>Salt Lake City, Utah |

[54] APPARATUS FOR AND METHOD OF MAKING SLITTED ARTICLES
17 Claims, 10 Drawing Figs.

[52] U.S. Cl. .................................................. 300/21,
83/10, 83/11, 83/12, 300/1
[51] Int. Cl. ........................................................ A46d 9/06
[50] Field of Search ........................................... 300/1, 21;
53/29; 83/7, 9, 10, 11, 12, 326

[56] References Cited
UNITED STATES PATENTS
| 1,033,411 | 7/1912 | Jones............................ | 83/12 |
| 3,094,735 | 6/1963 | Hanlon......................... | 300/21 X |

*Primary Examiner*—Granville Y. Custer, Jr.
*Attorney*—Hill, Sherman, Meroni, Gross & Simpson

ABSTRACT: Apparatus for and a method of making slitted articles, for example, an article in the general shape of a rectangular block, the apparatus providing slits extending only partially through the article and running both longitudinally and transversely of the article, there being slits in a plurality of faces of the article, if desired. The entire article is formed including the slits and passed through a packaging machine in substantially continuous motion at high speed.

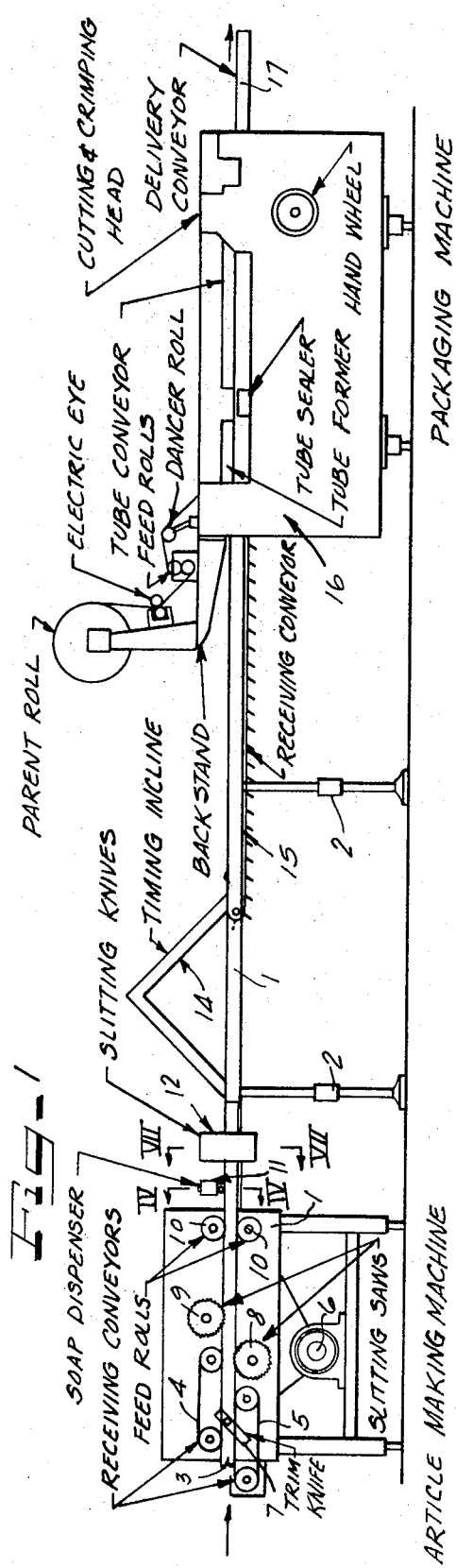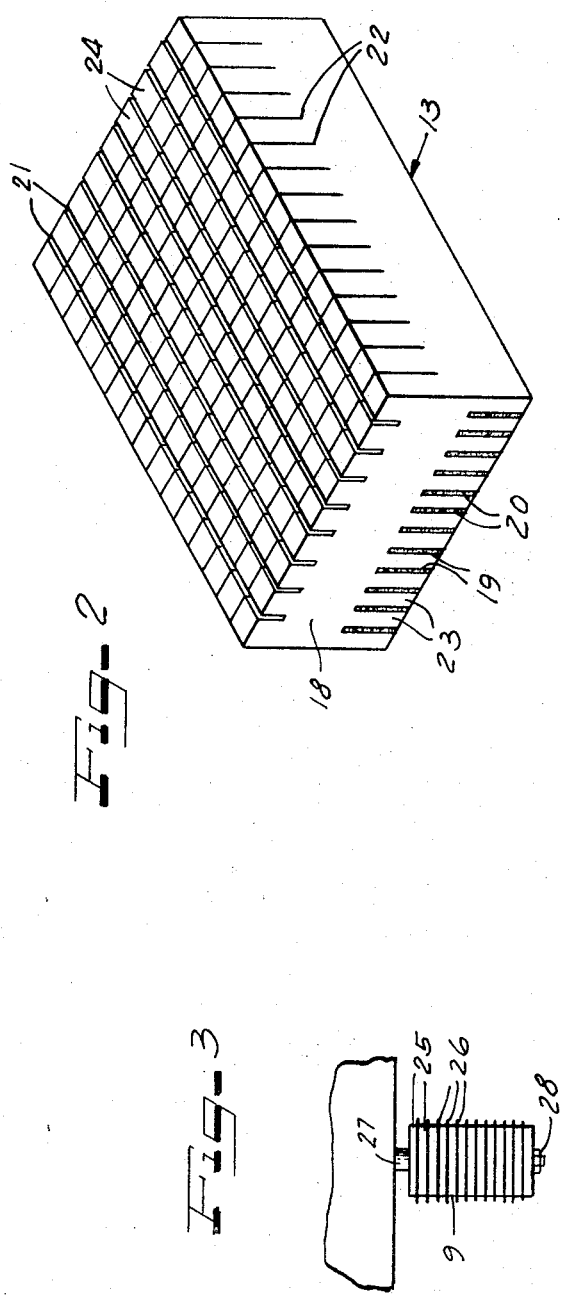
INVENTORS
KARL A. PANNIER, Jr.
GORDON S. REYNOLDS

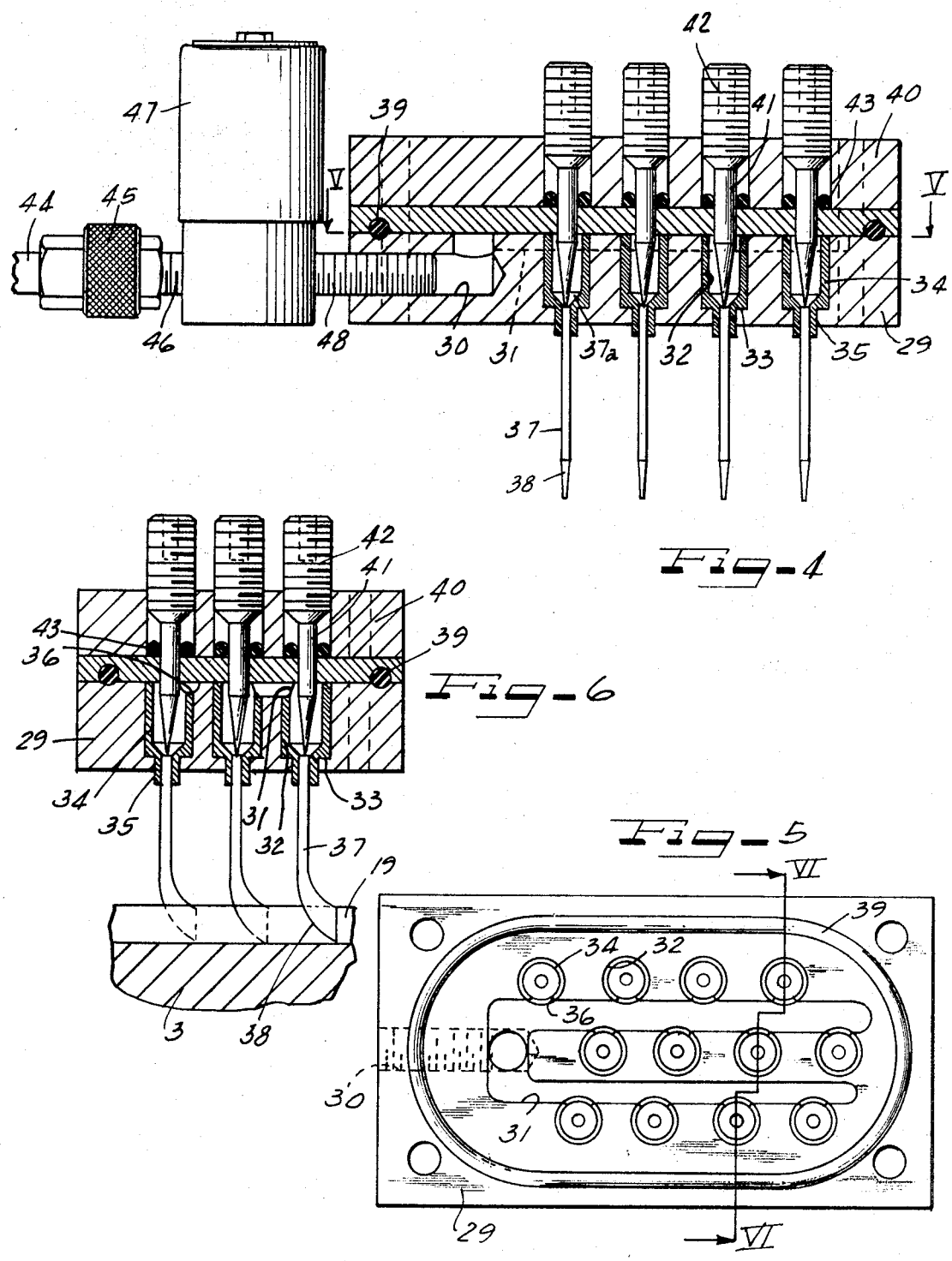

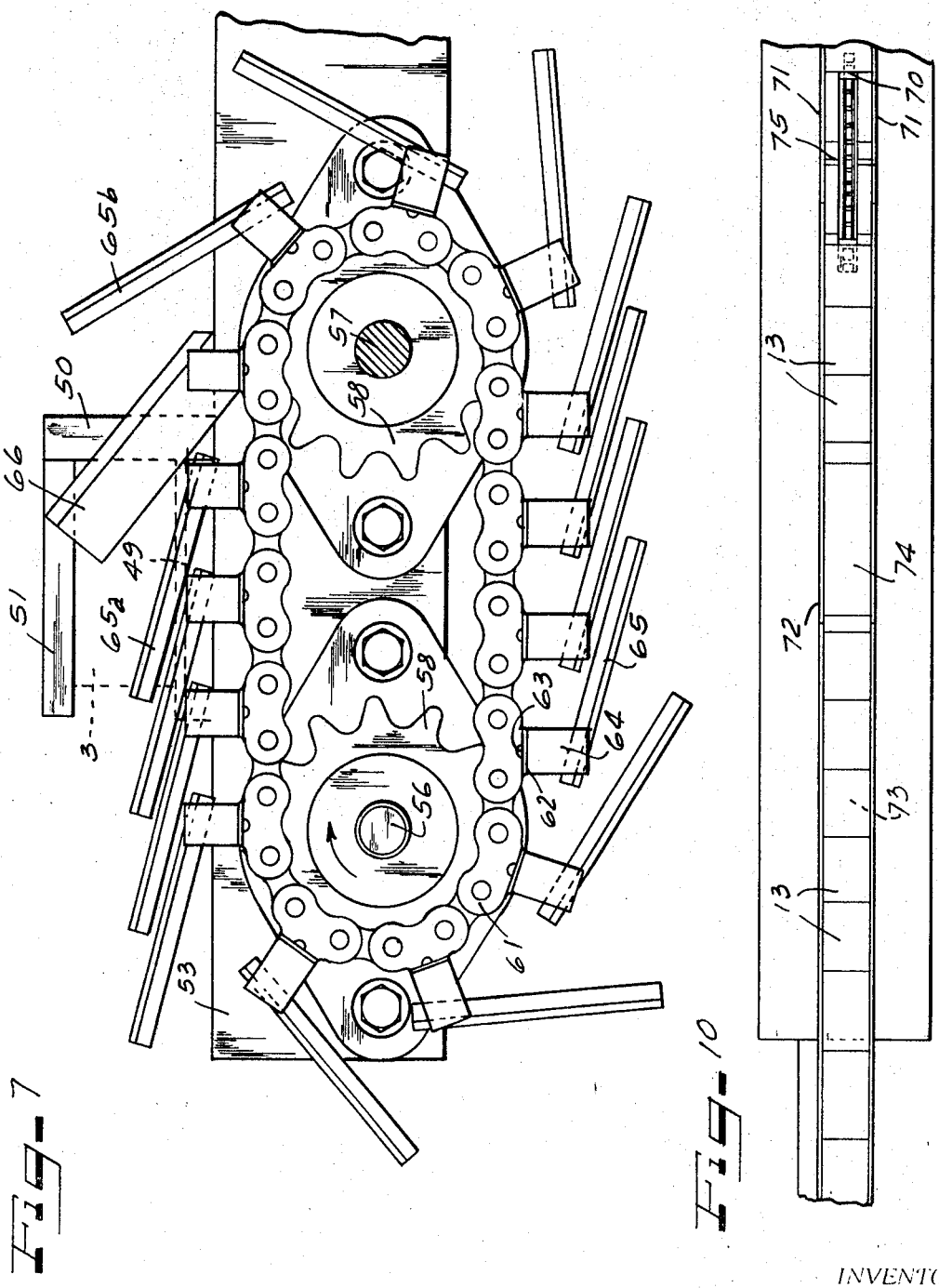

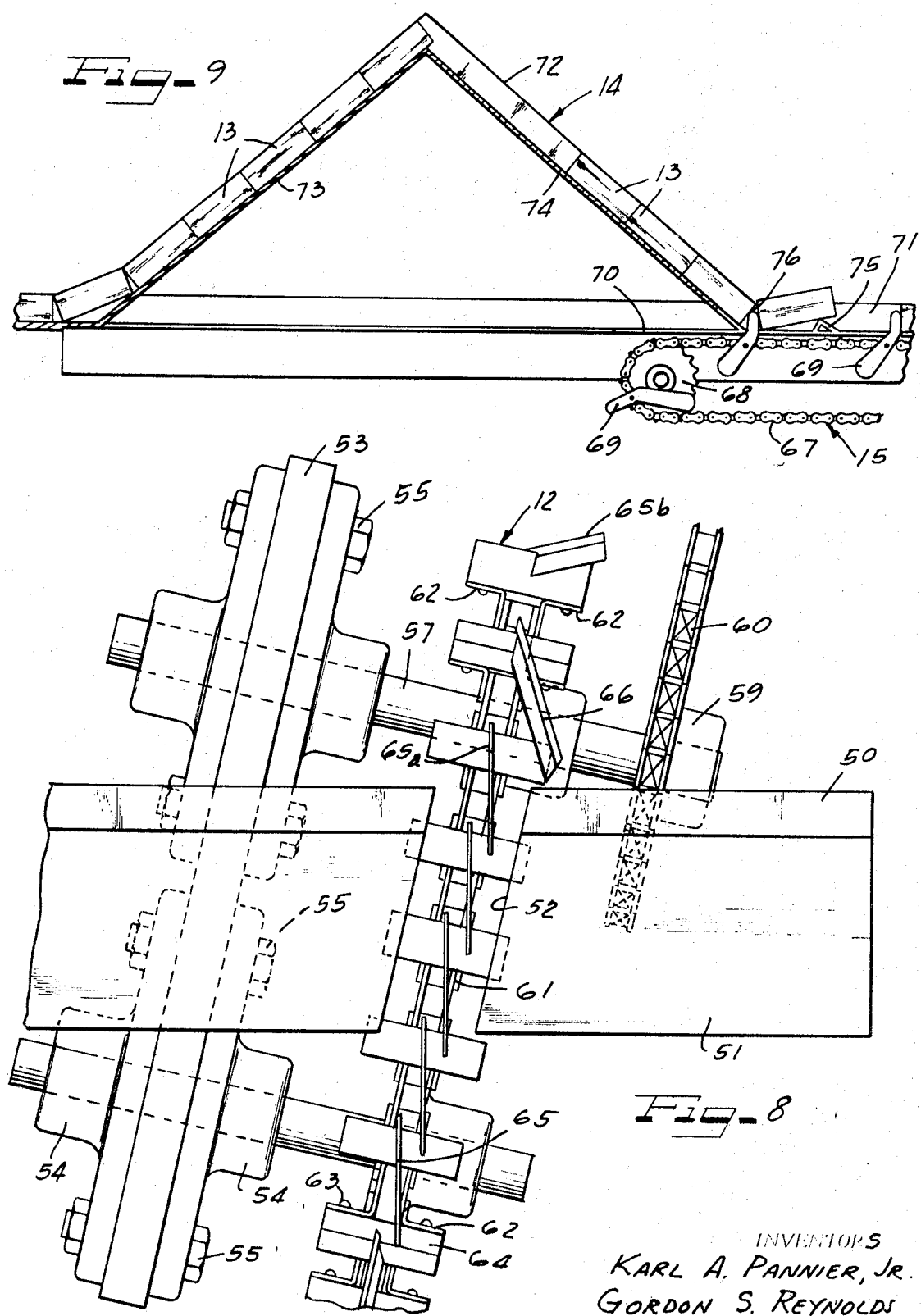

APPARATUS FOR AND METHOD OF MAKING SLITTED ARTICLES

CROSS-REFERENCE TO RELATED APPLICATION

In a Kenneth R. Lane copending application entitled "-Disposable scrub Brush," filed Nov. 18, 1968, Ser. No. 776,507, there is disclosed, described, and claimed an article for the production of which the instant invention is highly desirable. That application makes some reference to steps involved in the method embodied in this invention, but does not claim any method.

BACKGROUND OF THE INVENTION

1. Field of the Invention

The instant invention relates to manufacturing machinery, and more particularly to a machine for slitting a strip of stock of indefinite length, the machine being capable of slitting the stock on a plurality of faces thereof both longitudinally of the stock and laterally thereof, providing slits that extend only partially through the stock, equipment for filling certain of the slits with a foreign material, soap or the like, and cutting off predetermined lengths of the stock strip to provide a finished product which is automatically delivered to a packaging machine for wrapping.

2. Description of the Prior Art

It is well known that in the prior art there are bread-slicing machines, meat-slicing machines and the like, adhesive tape slitting machines, and machines for slitting into predetermined widths sheets of other material. However, applicants know of no prior art relating to the slitting of a strip of stock of indefinite length only partially therethrough and on a plurality of faces thereof, slits running both longitudinally and laterally of the strip, while the strip is in continuous motion. Applicants did search the market for such a machine but were unable to obtain one, and therefore invented the machine embodied in the instant invention.

SUMMARY OF THE INVENTION

The instant invention relates to a machine capable of making an article having various slits therein, and also to a method of making such article. The article being made is generally in the form of a rectangular block, and the machine embodies means for continuously feeding an elongated strip of stock along a predetermined path and while the strip travels that path, it is trimmed to exact width if it varies in width, provided with slits in one or both opposed faces, which slits extend longitudinally of the strip, and later providing laterally extending slits in at least one face of the strip and severing off from the strip articles of predetermined length. At one point in the process, if so desired, a foreign substance such as soap may automatically be inserted in certain of the slits. When the article is complete it still continues to move over a timing device which temporarily stops the article sufficiently for a conveyor to properly engage the article and feed it directly into a packaging machine. The movement of the stock strip and cutoff article is at high speed so that finished and packaged articles may be produced at least at the rate of 1 per second.

Other objects, features and advantages of the present invention will be readily apparent from the following detailed description of certain preferred embodiments thereof when taken in conjunction with the accompanying drawings.

BRIEF DESCRIPTION OF THE DRAWINGS

FIG. 1 is a diagrammatic elevational showing of a machine embodying principles of this invention, in operative association with a packaging machine, and also indicating the method embodied in this invention;

FIG. 2 is a perspective view of an article capable of being produced by the machine of FIG. 1;

FIG. 3 is an enlarged fragmentary top plan view of the upper slitting saw seen in the left-hand portion of FIG. 1;

FIG. 4 is an enlarged fragmentary transverse vertical sectional view, with parts shown in elevation taken substantially as indicated by the line IV-IV of FIG. 1;

FIG. 5 is a plant view of the lower part of the structure of FIG. 4, taken substantially as indicated by line V-V of FIG. 4;

FIG. 6 is a fragmentary transverse vertical sectional view taken substantially as indicated by the line VI-VI of FIG. 5;

FIG. 7 is a greatly enlarged transverse vertical sectional view taken substantially as indicated by the line VII-VII OF FIG. 1;

FIG. 8 is a fragmentary top plan view of the structure seen in FIG. 7;

FIG. 9 is a fragmentary enlarged elevational view of the timing mechanism seen in the left central portion of FIG. 1; and FIG. 10 is a fragmentary top plan view of the structure of FIG. 9.

DESCRIPTION OF THE PREFERRED EMBODIMENTS

In order to properly set forth the machine and method embodied in the instant invention it is necessary to define the making of a particular article. While the machine may be utilized to manufacture other articles, as will be apparent to those skilled in the art, we have selected by way of example, a disposable scrubbing brush of the type set forth in the aforesaid copending application, Ser. No. 776,507. Also, standard and well-known parts of any machine, such as detail frame construction, drive sources such as motors, bearing mounting, and the like, are not fully shown in the drawings in order to avoid prolixity. FIG. 1, by way of legends, effectively locates the various working parts of the machine and its association with a packaging machine. The essential features of the packing machine are also indicated by legends, but the packaging machine per se is not a part of this invention, but a machine of known construction that may be purchased on the open market. It will also be understood that the frame of the machine is provided with a suitable bedplate over which the stock strip is moved, that plate being provided with openings wherever needed for the adequate operation of the respective parts.

With reference now to FIG. 1, it will be seen that the machine includes a frame 1 supported on suitable legs certain of which, as indicated at 2, are adjustable as to height so that the bed of the machine may be properly leveled. The stock strip enters the machine from the left end thereof as indicated by an arrow in FIG. 1, and exits from the entire assembly at the right end of the packaging machine as indicated by an arrow.

As the stock strip 3 enters the article-making machine it is engaged between upper and lower receiving conveyors 4 and 5, respectively, which advance the strip along its path of travel. These receiving conveyors may be driven by way of a motor 6 mounted on the machine frame and it is to be understood that the various driven parts of the machine may all be driven from this same motor, if desired, by way of driving connections such as chain and sprocket assemblies, not shown in the drawings, since they are well known in the machine art. Mounted on the frame of the machine adjacent the point of entry of the strip, is a trim knife 7 which is a sharp blade disposed at an angle to insure that the strip passes through the machine of even width. This knife is stationary and trims off any excess in the width of the strip as it enters the machine, the trimmings falling into a suitable totebox or the like. The advancing strip next passes over a lower gangsaw 8 which provides spaced slits in which is then the lower face of the strip and longitudinally thereof. Almost immediately the strip passes underneath an upper gangsaw 9 which provides slits longitudinally of the strip in the then upper face thereof. Next the strip is engaged between a pair of feed rolls 10-10 which pinch the strip and forcibly advance it through the rest of its path of travel within the article-making machine. The strip next passes under a soap-dispensing assembly, generally indicated by numeral 11, which fills as many as desired of the grooves made by the gang saw 9 with soap or other detergent in a paste form. The strip then passes over a slitting knife assembly, generally indicated by numeral 12, which provides transverse slits in the then lower face of the strip and also severs a predetermined length from the strip which is the finished product, generally indicated by numeral 13, and seen in FIG. 2. These products are then pushed successively over a timing device generally indicated by numeral 14 which causes a hesitation in the ultimate movement of the articles so that they may be received in proper order and timing by a receiving conveyor generally indicated by numeral 15 which transfers the finished articles in properly spaced relationship into the packaging machine generally indicated by numeral 16. Since this packaging machine is a known form of machine, it will not be herein specifically described, the various essential elements of the machine being indicated by legends in FIG. 1. It will suffice to say that the packaging machine wraps the article in a tube of paper seamed and sealed at each end transversely thereof. After the article has been so packaged, it exits on a delivery conveyor 17 to a point where it may be sterilized, or to a point where it may be placed in a carton for shipment, depending upon the use intended for the article so packaged.

An article desirably formed on the machine and method generally described above is illustrated in FIG. 2 and is in the form of a disposable scrub brush, highly desirable for use by surgeons, cosmeticians, mechanics and other factory men, and even household purposes. When used by a surgeon, the brush is discarded after a single usage, otherwise when it is devoid of soap or other detergent or when it becomes worn. Consequently, it must be manufactured extremely economically. The brush is preferably made of a chemical foam, various foams such as the styrene, urethane and vinyl foams, among others, a highly satisfactory and proven brush may be made from an expanded low-density polyethylene foam of the closed-cell type, and a weight between 2 and 3 pounds per cubic foot. As seen in FIG. 2, the brush is inverted with respect to its position on the bed of the article-making machine, and comprises a rectangular block 18 of semirigid foam. The longitudinally extending slits 19 are those cut by the upper gangsaw 9 of the machine and these are filled with soap, for example, from the dispenser 11 of the machine. The longitudinally extending slits 21 in the opposite face of the brush are those cut by the lower gangsaw 8, and the very narrow transverse slits 22 in the same brush face are those provided by the slitting knife assembly 12, which also cut the brush free from the stock strip 3. In the finished brush the transverse slits 22 are substantially invisible unless the brush is slightly bent. Being of closed-cell foam, the brush will always maintain its shape, and while it may be compressed during usage, it will automatically assume its original shape upon release of pressure and will not matt down or act like a sponge. It will be further noted that not any of the slits extend entirely through the brush but only partially therethrough so that the brush will have a central substantial body portion. Ribs 23, defined by the slits 19, and polygonal projects 24 defined by the slits 21 and 22 provide the scrubbing surfaces of the brush.

In FIG. 3, we have illustrated the upper gangsaw 9 consisting of a series of spacer washers 25 with a circular saw blade 26 mounted between adjacent shims, the saw blades corresponding in number to the number of grooves 19 in the brush 13. The shims and saws are held on a shaft 27 driven by the aforesaid motor 6 by means of a bolt and nut arrangement 28 which can be removed so that the number of saw blades may be selectively changed depending upon the number of grooves desired in the bush. Also, the width of the saw blades may be changed to vary the width of the slits 19 as may be desired. The lower gangsaw 8 is of the same construction. The saws rotate so that the cutting edges thereof travel oppositely to the direction of travel of the stock strip 3. The cutting edges of the saws travel at a very high speed, in the neighborhood of 4000 feet per minute, for example. The stock strip travels much slower.

In FIGS. 4, 5 and 6 we have illustrated the soap dispenser 11 of the machine. This dispenser includes a base block 29 having an angled entrance passage 30, the outer part of which is internally threaded, and which leads upwardly at the inner end thereof to a distributing channel 31 recessed into the upper face of the block and having the general shape of an elongated lazy U. Adjacent the arms of the channel 31 are horizontal rows of bores extending through the base 29, there being three rows of four bores each in the illustrated embodiment. These bores are shouldered at the bottom as indicated at 33 by way of a reduced diameter inside the base 29. Seated in each bore is a receiving cylinder 34 having a nipple 35 of reduced size projecting through the lower portion of the bore below the shoulder 33 of the block. As seen best in FIG. 5, each of the cylinders 34 is provided with an opening 36 in the sidewall thereof in communication with the delivery channel 31. Extending below the base block 29 through each nipple 35 is a hollow finger 37 which functions as a delivery nozzle for the soap or other detergent. At the top thereof each hollow finger is flared at the top as indicated at 37a to provide a valve seat and hold the respective finger within its cylinder. At the lower end thereof each finger 37 is curved forwardly in the direction of travel of the stock strip 3 and vertically flared and flattened a trifle, as shown at 38. As seen in FIG. 6, these soap delivery fingers enter the longitudinal grooves 19 cut in the stock strip by the upper gangsaw 9, and discharge soap into these grooves in the direction of movement of the stock strip. With reference to FIG. 5, it will be noted that the discharge fingers are compactly disposed in separate rows but each finger is out of alignment with any other finger in the direction of movement of the stock strip, such arrangement providing ample room to accommodate the desired number of discharge finger and accommodate closely spaced slits in the stock strip. Seated in a suitable groove in the upper face of the block surrounding the arrangement of the discharge needles is an O-ring 39 to provide an adequate seal between the base block 29 an a control head 40 disposed thereupon.

This control head 40 is provided with a series of bores in alignment with those in the base block in each of which is a needle valve 41 having an enlarged upper end 42 threadedly engaged within its respective bore. When the needle valve is screwed downwardly, it comes to rest on the valve seat provided by the flared heads of the discharge needles and seals off that particular needle, providing a selection as to how many of the needles will function to distribute soap in the grooves 19 of the stock strip. In some instances it may be desired to have soap discharged into a lesser number of grooves than in other instances, and in some cases no soap at all is wanted in the resultant scrub brush. The needle valve are sealed against leakage by means of an O-ring 43 or the equivalent, disposed around the shank of the needle valve.

Soap or other detergent is forced from a supply container by compressed air, now shown in the drawings, through a pipe 44 removably connected by union 45 to a pipe 46 leading into the interior of a known type of solenoid valve 47 which maintains the pressure on the incoming soap at a constant level. From the tank of the solenoid valve the soap is discharged through a pipe 48 into the passage 30 of the base block 29.

In FIGS. 7 and 8 we have illustrated the structure of the slitting knife assembly 12 of the machine and the manner in which it is associated with the path of travel of the stock strip. As stated above, this assembly provides the transverse slits 22 in the ultimate brush 13 and also severs the brush from the leading end of the stock strip. In the region of the assembly 12, the frame of the machine is so constructed as to define a bed 49 on which the stock strip travels, an upstanding back guide 50, and a front overhang 51 which holds down the stock strip so that it cannot buckle during the cutting operation. This section of the frame is provided with a slot 52 entirely therethrough to provide a passage for the cutting knives.

The knife assembly 12 includes and is supported by a mounting bracket 53 secured in any suitable manner to the frame of the machine and disposed obliquely at an angle to the path of travel of the stock strip 3. Secured to this bracket 53, adjacent each end thereof, is a pair of bearing mounts 54-54, one on each side of the bracket and held in place by bolts 55. Extending forwardly from each set of bearing mounts is a shaft, these shafts being numbered 56 and 57 respectively. Each shaft carries an identical sprocket thereon, and the shaft 57 extends forwardly beyond its sprocket and to its outer end is attached another sprocket 59 which is in mesh with a drive chain 60 by means of which the shafts 56 and 57 are rotated. Trained over the sprockets 58-58 is a linked endless roller chain 61 certain links of which carry flanges 62 extending laterally in respect to the chain itself. In the illustrated embodiment, every other link carries such flanges. Secured to each set of flanges, as by screws 63, is a mounting block 64 carrying a knife blade 65 disposed at such an angle to the axis of the chain 61 as to be perpendicular to the axis of travel of the stock strip since the chain 61 has an axis along the same angle to the stock strip path as the mounting bracket 53. The knife is also disposed at an angle upwardly and away from its respective mounting block, such angle depending upon the depth of slit to be cut into the stock strip, the height of the trailing edges of the knife determining the depth of the slit. These knives 65 are in the general character of a very narrow single-edged razor blade. One knife carried by the chain 61, however, designated at 66, is disposed at a higher angle to the block than the remaining knives and is wider than any of the remaining knives, this being the knife which is so disposed as to cut entirely through the stock strip and sever a finished brush 13 therefrom.

With a total of 15 knives, including the cutoff knife 66, as shown in the illustrated embodiment, the finished brush 13 will be provided with 14 slits 22 thus establishing 15 lateral rows of projects 24 each measuring approximately 0.20 inch lengthwise the brush, assuming that the stock strip travels at the rate of 15 feet per minute through the machine, and the brush is approximately 3 inches in length. One satisfactory size for scrubbing brushes of this type is 3 inches long, 2 inches wide, and the block being approximately 1 inch in thickness. With a brush that size, therefore, it will be apparent that 60 brushes would be severed from a 15 foot length of stock, and a brush is both slitted and severed in one complete revolution of the chain 61. The chain is timed to sever a brush at each complete revolution. For this example, the angle at which the axis of the knife-carrying chain 61 travels would be 12° relatively to the axis of travel of the stock strip, and the knife blades would be disposed at an angle of 12° to the axis of the chain so as to always be perpendicular to the axis of the stock strip and compensate for the travel of the strip. The stock strip does not stop its forward travel during the slitting operation. To that end, the knife will first contact the strip adjacent the block to which it is attached and terminate its cut at the trailing edge of the knife, thereby providing a cut straight across the stock strip notwithstanding the fact that the stock strip is continuously in motion.

In some instances it is desirable in a brush, such as the brush 13, to have the projects 24 in the two rows at each end of the brush twice as long in order to provide a more rigid and sturdy portion at each end of the brush. To this end, it is a simple expedient to remove the knives 65a and 65b on either side of the cutoff knife 66, thereby eliminating the first slit at each end of the block. Should a plurality of evenly spaced projections of a different number than that shown in the drawings be desired, a chain having a lesser or greater number of knives would be substituted for that illustrated. The variances possible in the measurement of the projections 24 lengthwise of the block are numerous since any desired ones of the knives may be removed in the proper location to establish such disposition of longer projects. Angling the knives in an outward direction relatively to their mounting blocks determines the depth of cut made and this may also be varied as desired.

It is desirable in most instances to motorize the article-making machine and the packaging machine separately, but nevertheless they should handle the brushes at the same speed at which they move through the article-making machine so that the packaging machine turns out wrapped brushes at the same speed they are made. In order to ensure proper wrapping of each brush in the packaging machine, the brushes should be sequentially timed. With this in mind, we have shown such a timing arrangement in FIGS. 9 and 10 whereby the brushes may be delivered at the proper sequential timing to the packaging machine.

The conveying assembly 15 which delivers the brushes into the packaging machine, as seen in FIG. 9, comprises an endless linked roller chain 67 trained over a pair of sprockets 68, one not being shown. This receiving conveyor has pickup legs 69 attached to certain links thereof, the lugs being equally spaced apart. While the chain operates beneath the bed of the machine, the lugs project upwardly through a suitable slot 70 in that bed, the brushes being guided by suitably spaced upstanding sidewalls 71-71 along the path to the packaging machine.

In order to ensure picking up of the finished brushes by the lugs in proper order, a timing arrangement is provided just ahead of the point of engagement by the conveyor lugs. This timing arrangement includes a trough-shaped member 72 having the general form of an inverted V, providing an upward incline 73 and a downwardly inclined chute 74, the brushes being successfully pushed up and over the incline 73 by following brushes and passed down the chute 74 by gravity. Adjacent the bottom of the chute 74 there is a stop member 75 in the general form of an inverted V over which a brush is pushed when engaged by a conveyor lug 69. This stop member causes a temporary delay in the movement of the brush, which temporary delay is compensated for by the fact that a brush will gravitate down the chute 74 faster than it travels up the incline 73 and thereby the overall speed of travel through the article-making machine and the packaging machine remains virtually constant. When a brush is stopped by the member 75, it will act as a buffer for the following brushes gravitating down the chute 74, and since the leading brush will be on the level substantially at the stop member, there will be a V-shaped crack 76 between the leading and next following brush permitting easy entrance of a conveyor lug 69, as illustrated best in FIG. 9. At the start of an operation, the article-making machine is first put into motion, and after three or four brushes have gravitated down the chute 74, the packaging machine may be put into motion, thus preserving a space between the brush at the top of the incline 73 and the last brush within the chute 74, which space will be maintained throughout the operation of the machine and prevent any possible jamming of the brushes.

In view of the foregoing, it will be noted that an article is both made and packaged in one continuous operation and the articles are successively produced and packaged at an exceedingly rapid rate, adding materially to the economy of production.

It should be noted that in the manufacture of articles by the method here involved, reliance is had upon the depth, width, and spacing, or upon any one or more of them, of the slits to determine the desired texture of a brush, for example, for any specific purpose. Various dimensions, depths, and spacing of slits are more fully discussed in the aforesaid pending application, Ser. No. 776,507, denoting that the brushes may be made with a texture on one scrubbing face so soft that the brush may be used to wash a newborn infant, and in other instances made so coarsely and rough that the brush may be used to clean a white-wall automobile tire, and any variance in texture therebetween may be had as desired. The gangsaws 8 and 9 may be readily varied as to spacing, wider or narrower saws substituted, and saws of larger diameter utilized to effect any desired change in the character of the slits. Likewise, the slitting knives may be adjusted to determine depth of slit, or more or less knives utilized to determine spacing between slits wherever desired.

Although various minor modifications might be suggested by those versed in the art, it should be understood that we wish to embody within the scope of the patent warranted hereon all

We claim as our invention:

1. In a machine for making slitted articles,
means defining a predetermined path of travel,
means for moving a stock strip along said path,
slitting means projecting into said path to provide spaced longitudinal slits in the advancing web,
other slitting means adjacent said path to provide spaced lateral slits in the moving stock strip at right angles to the longitudinal slits,
all said slits being only partially through the stock strip, and
means embodied in said other slitting means to sever the strip laterally therethrough and cut off a finished article from the strip.

2. The machine of claim 1, in which the first said slitting means is in the form of a gangsaw.

3. The machine of claim 1, in which said other slitting means is in the form of a flying knife assembly.

4. The machine of claim 1, in which wall said slitting means act on one face of the stock strip, and including additional slitting means acting on the opposite face of said strip to provide longitudinal slits therein.

5. The machine of claim 1 in series arrangement with a wrapping machine, and including
a delivery conveyor leading from said path of travel to the wrapping machine, and
timing means along said path of travel to insure delivery of a finished article at the proper time to said delivery conveyor.

6. The machine of claim 3, in which one of said flying knives in said assembly is wider than the others to cut through the strip and sever the finished product.

7. The machine of claim 3 in which said flying knife assembly is disposed at an angle to the path of travel of said strip to cut transversely across said strip while the strip continues in motion.

8. The machine of claim 4 in which the finished product is a scrub brush an including
dispensing means arranged to enter and deposit a cleansing substance in certain of said slits.

9. The machine of claim 8, in which said dispensing means include
a base block, and
a series of hollow fingers depending from said base block flattened and flared at their lower ends to enter slits in said stock strip.

10 The machine of claim 9, including
means to supply cleansing substance to said base block,
said base block having manifold means therein to receive said substance and supply it to said fingers.

11. The machine of claim 9, including
valve means controlling the flow of said substance through each of said fingers.

12. The machine of claim 5, in which said timing means comprise
an inverted V-shaped chute up one side of which the finished products are forced by movement of the stock strip and down the other side of which the products may gravitate to halt temporarily at the bottom in order to be picked up by said delivery conveyor in proper order.

13. The method of making slitted articles, including the steps of
feeding a stock strip along a predetermined path,
slitting said strip a plurality of times longitudinally and transversely thereof partially therethrough,
cutting off completed articles from said strip, and
governing the texture of a slitted face of the articles by the spacing of said slits.

14. The method of claim 13 including varying the width of said slits to further control the texture of a slitted face of said articles.

15. The method of claim 13 including the steps of
providing slits on opposite sides of said strip, and
varying the width of the slits on said opposite sides to provide different textures on opposite faces of said article.

16. The method of claim 13 including the step of
varying the depth of said slits to control the texture on a slitted face of said articles.

17. The method of claim 13, including the steps of
moving said strip continuously along its path of travel,
conveying the finished articles to a wrapping machine, and
temporarily halting movement of each finished article just prior to the conveying thereof to ensure proper timing of delivery to the wrapping machine.